(12) United States Patent
Nakamura (10) Patent No.: US 10,029,727 B2
(45) Date of Patent: Jul. 24, 2018

(54) ROTATING ELECTRIC MACHINE CONTROL DEVICE

(71) Applicant: DENSO CORPORATION, Kariya, Aichi-pref. (JP)

(72) Inventor: Kouichi Nakamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/195,739

(22) Filed: Jun. 28, 2016

(65) Prior Publication Data

US 2017/0001661 A1 Jan. 5, 2017

(30) Foreign Application Priority Data

Jul. 2, 2015 (JP) ................................. 2015-133668

(51) Int. Cl.
| | | |
|---|---|---|
| *G05B 23/00* | (2006.01) | |
| *B62D 5/04* | (2006.01) | |
| *H02P 23/14* | (2006.01) | |
| *H02P 29/60* | (2016.01) | |
| *B62D 5/00* | (2006.01) | |

(52) U.S. Cl.
CPC ......... *B62D 5/0496* (2013.01); *B62D 5/0463* (2013.01); *B62D 5/0487* (2013.01); *H02P 23/14* (2013.01); *H02P 29/60* (2016.02); *B62D 5/008* (2013.01)

(58) Field of Classification Search
None
See application file for complete search history.

(56) References Cited

U.S. PATENT DOCUMENTS

| | | | | |
|---|---|---|---|---|
| 2005/0258807 | A1* | 11/2005 | Yanagi | ............ H02P 29/02 322/33 |
| 2010/0186704 | A1* | 7/2010 | Sekiguchi | ............ F02P 19/02 123/179.3 |
| 2012/0101683 | A1* | 4/2012 | Nishimura | ............ B62D 5/0463 701/41 |
| 2012/0111658 | A1* | 5/2012 | Hori | ............ B62D 5/008 180/446 |
| 2014/0118866 | A1 | 5/2014 | Iwami et al. | |

* cited by examiner

*Primary Examiner* — Bentsu Ro
*Assistant Examiner* — Zemenay Truneh
(74) *Attorney, Agent, or Firm* — Knobbe, Martens, Olson & Bear, LLP (57) ABSTRACT

A rotating electric machine control device includes a first system controller and a second system controller, an overheat protection controller and an abnormality detector. The overheat protection controller includes a temperature estimator and a restricted current calculator. The temperature estimator estimates system temperatures as well as other temperature, including a shared component temperature of a shared component that is connected to both of plural systems in a shared manner. The restricted current calculator calculates restricted current values, based on the system temperatures and the shared component temperature. At least one of the system temperatures, the shared component temperature, and/or the restricted current values is changed from an all-systems normal time, when at least one of a plurality of systems is abnormal.

8 Claims, 9 Drawing Sheets

ROTATING ELECTRIC MACHINE CONTROL DEVICE

CROSS REFERENCE TO RELATED APPLICATION

The present application is based on and claims the benefit of priority of Japanese Patent Application No. 2015-133668, filed on Jul. 2, 2015, the disclosure of which is incorporated herein by reference.

TECHNICAL FIELD

The present disclosure generally relates to a rotating electric machine control device.

BACKGROUND INFORMATION

Conventionally, an electric power steering control device that controls the electric motor of the electric power steering device is known. For example, according to a disclosure in a patent document, Japanese Patent No. 5575205 (patent document 1), an amount of heat generation is estimated from the amount of electric current, for performing an overheat protection.

In the patent document 1, one driver is provided for one group of three-phase circuit coils. In the patent document 1, no overheat protection is discussed for the plural sets of the driver, and the group of coils in the control device.

SUMMARY

It is an object of the resent disclosure to provide a rotating electric machine control device that is capable of providing an overheat protection when a part of the plural systems has abnormality.

The rotating-electric-machine control device of the present disclosure controls a drive of a rotating electric machine which has plural winding groups, and is provided with plural inverter units and a control unit.

The inverter unit is provided for each of the plural winding groups.

The control unit has an electric current controller, an overheat protection controller, and an abnormality detector. The electric current controller controls an electric current supplied to the plural winding groups. The overheat protection controller calculates the restricted current value which is the maximum, i.e., an upper limit, of the electric current supplied to each of the plural winding groups. The abnormality detector detects an abnormality of the winding group and the inverter unit.

The overheat protection controller includes a temperature estimator and a restricted current calculator.

The temperature estimator estimates a system temperature and a shared component temperature.

The system temperature is a temperature of each of the plural systems which are a combination of a winding group and an inverter unit correspondingly combined with each other.

The shared component temperature is a temperature of a shared component connected to both of the plural systems.

The restricted current calculator calculates a restricted current value based on the system temperature or the shared component temperature.

At least one of the system temperatures, the shared component temperature, and/or the restricted current values is changed from a value during an all-systems normal time when all of the plural systems operate without having abnormality, when at least one of the plural systems is abnormal, and a drive of the electric rotating machine is continued by using at least one of remaining systems that is functioning normally. In such manner, an overheat protection at a time of continuing the drive of the rotating electric machine by using the normal system is appropriately performed.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, a rotating electric machine control device of the present disclosure is described based on the drawings. The same numerals are assigned to the same/similar parts in the following embodiments, for saving the repetition of the description of the same parts.

First Embodiment

A rotating electric machine control device in the first embodiment of the present disclosure is shown in FIGS. 1-7.

A rotating electric machine control device 10 in the first embodiment of the present disclosure is applied to an electric power steering apparatus 8 for assisting the steering operation by the driver.

As for a drive unit 1, one body combination of two parts, i.e., a motor 80 as a rotating electric machine and a rotating electric machine control device 10, serves as the drive unit 1. The motor 80 and the rotating electric machine control device 10 may also be provided as two separate components.

Figure 1:
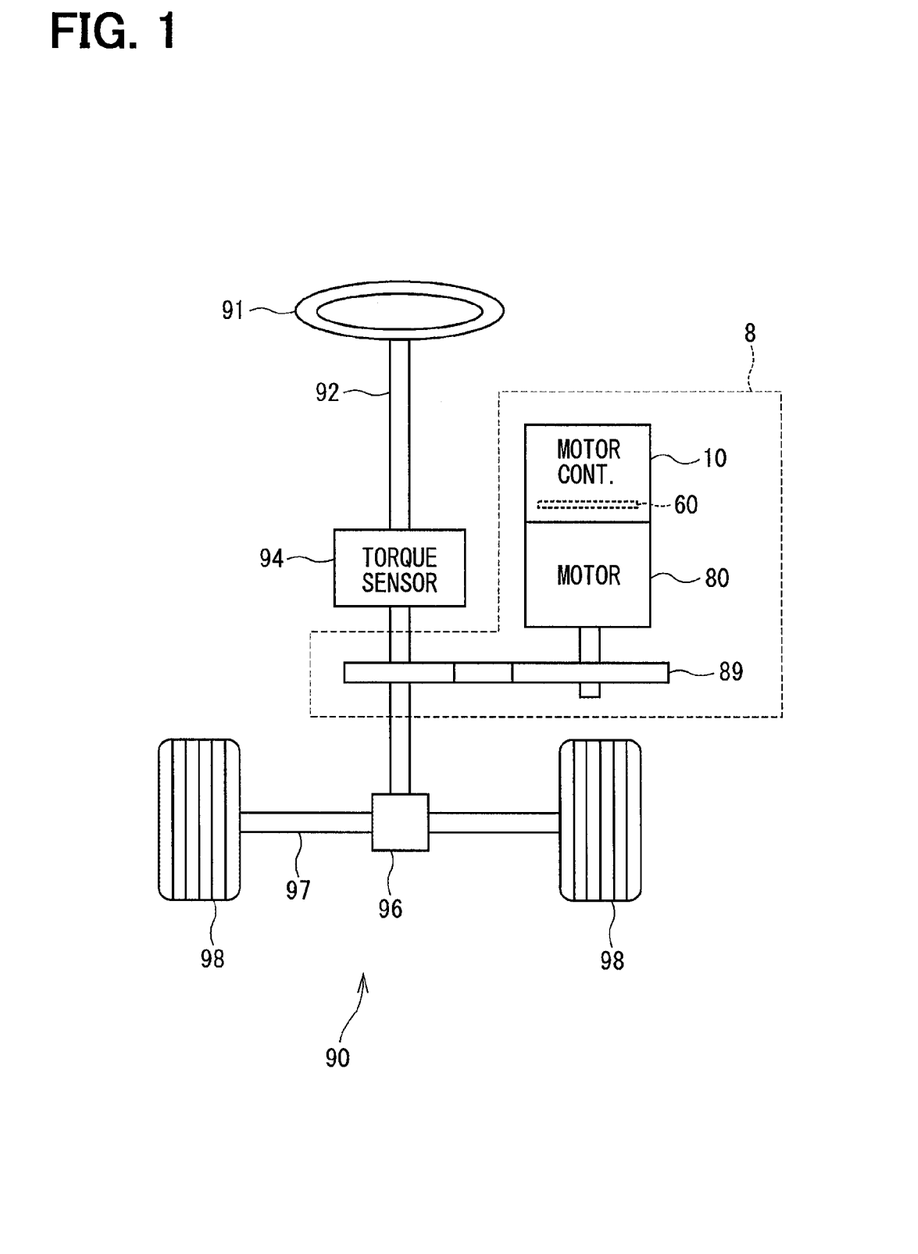
FIG. 1 is a schematic diagram of a steering system in a first embodiment of the present disclosure.

As shown in FIG. 1, a steering system 90 includes a steering wheel 91 which is a steering member, a steering shaft 92, a pinion gear 96, a rack shaft 97, a tire 98, an electric power steering apparatus 8 and the like.

The steering wheel 91 is connected with the steering shaft 92. The steering shaft 92 has a torque sensor 94 that detects the steering torque inputted to the steering shaft 92 when the driver operates the steering wheel 91. The pinion gear 96 is formed at a tip of the steering shaft 92, and the pinion gear 96 engages the rack shaft 97. A pair of tires 98 is connected to both ends of the rack shaft 97 via a tie rod or the like.

When the driver rotates the steering wheel 91, the steering shaft 92 connected with the steering wheel 91 rotates. The rotational movement of the steering shaft 92 is turned into the translational movement of the rack shaft 97 by the pinion gear 96, and the pair of tires 98 is steered by an angle according to the amount of the translational movement of the rack shaft 97.

The electric power steering apparatus 8 is provided with the motor 80, which outputs an assist torque for assisting a steering operation of the steering wheel 91 by the driver; the rotating electric machine control device 10, which controls a drive of the motor 80; and a speed reduction gear 89 which, as a power transmission unit, reduces a rotation speed of the motor 80, and outputs a power to the steering shaft 92.

Although, in the present embodiment, the electric power steering apparatus 8 is a "column assist" type that assists the rotation of the steering shaft 92 with the torque generated by the motor 80, the apparatus 8 may also be a "rack assist" type that assists a drive of the rack shaft 97. In other words, a drive object in the present embodiment is the steering shaft 92, the drive object of the motor 80 may also be the rack shaft 97.

The motor 80 is driven by an electric power that is supplied from a battery 5 (refer to FIG. 2) as a power supply, and rotates the speed reduction gear 89 reciprocally, i.e., forward or backward.

Figure 2:
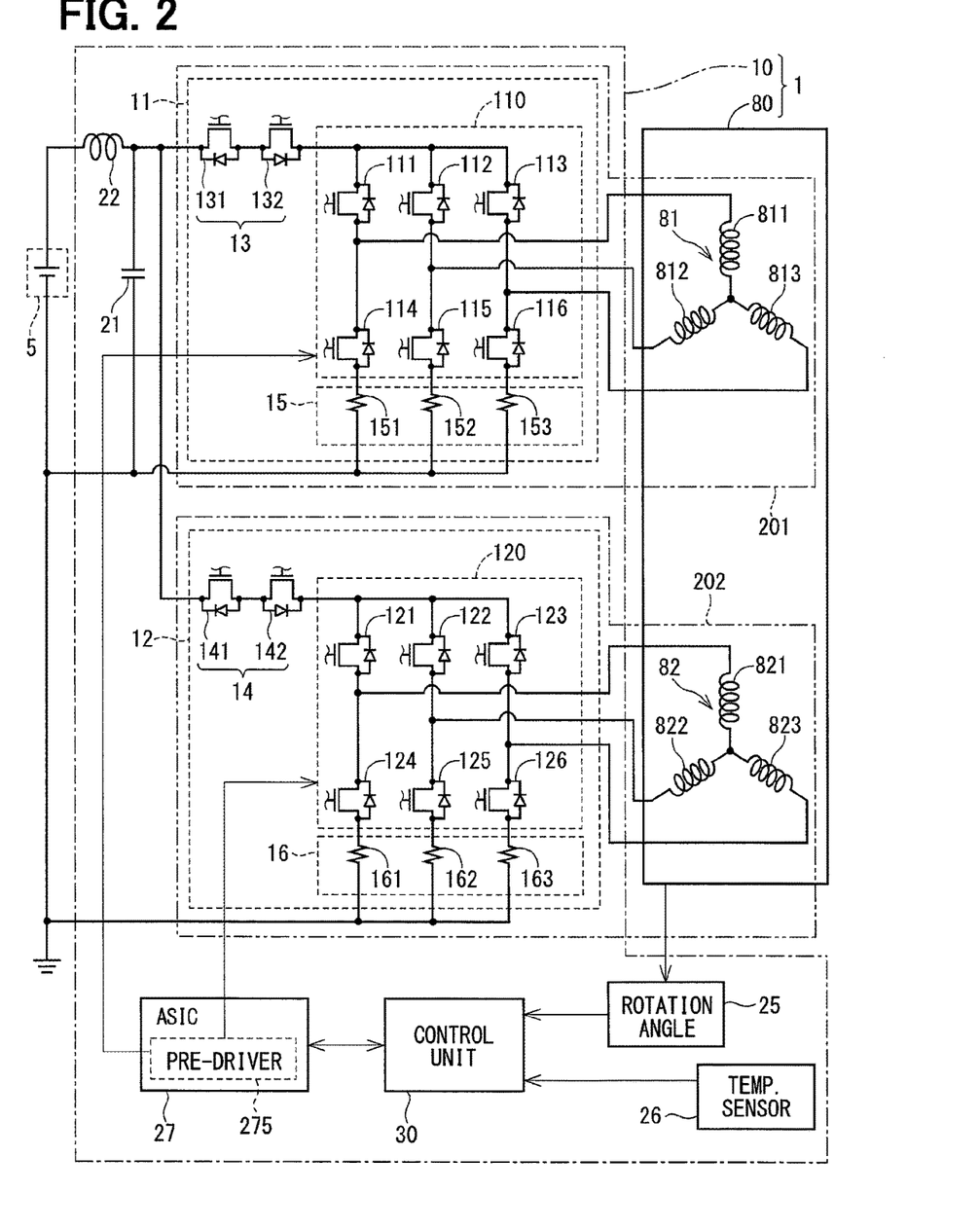
FIG. 2 is a circuit diagram of a rotating electric machine control device in the first embodiment of the present disclosure.

Next, the electric configuration of the electric power steering apparatus 8 is described based on FIG. 2.

In FIG. 2, for the readability of the drawing, control lines etc. are omitted from the drawing.

The motor 80 is a three-phase brushless motor, and has a first winding group 81 and a second winding group 82, respectively wound on a non-illustrated stator.

The first winding group 81 has a U1 coil 811, a V1 coil 812, and a W1 coil 813. The second winding group 82 has a U2 coil 821, a V2 coil 822, and a W2 coil 823.

The rotating electric machine control device 10 is provided with a first inverter unit 11, a second inverter unit 12, a capacitor 21 and a choke coil 22, a rotation angle sensor 25, a temperature sensor 26, an Application-Specific Integrated Circuit (ASIC) 27, a control unit 30 and the like.

The electronic components of the rotating electric machine control device 10 are mounted on a board 60 (refer to FIG. 1).

The first inverter unit 11 is provided with a first inverter 110, a first relay unit 13, and a first current detector 15.

The second inverter unit 12 is provided with a second inverter 120, a second relay unit 14, and a second current detector 16.

The first inverter 110 is a three-phase inverter, and is provided as a bridge connection of six switching elements 111-116.

The junction point of the switching elements 111 and 114 of the U phase which are the paired elements is connected with the U1 coil 811.

The junction point of switching elements 112 and 115 of the V phase which are the paired elements is connected with the V1 coil 812.

The junction point of switching elements 113 and 116 of the W phase which are the paired elements is connected with the W1 coil 813.

The second inverter 120 is a three-phase inverter, and is provided as a bridge connection of six switching elements 121-126.

The junction point of switching elements 121 and 124 of the U phase which are the paired elements is connected with the U2 coil 821.

The junction point of switching elements 122 and 125 of the V phase which are the paired elements is connected with the V2 coil 822.

The junction point of switching elements 123 and 126 of the W phase which are the paired elements is connected with the W2 coil 823.

The first relay unit 13 has a power relay 131 and a reverse connection protection relay 132.

The power relay 131 is disposed at a position between the battery 5 and the first inverter 110, and conducts or interrupts the electric current between the battery 5 and the first inverter 110.

The reverse connection protection relay 132 is disposed at a position between the power relay 131 and the first inverter 110. The reverse connection protection relay 132 has a parasitic diode connected in reverse relative to a diode of the power relay 131, and prevents the electric current from flowing in reverse, when it the battery 5 is accidentally connected in reverse.

The second relay unit 14 has a power relay 141 and a reverse connection protection relay 142.

The power relay 141 is disposed at a position between the battery 5 and the second inverter 120, and conducts or interrupts the electric current between the battery 5 and the second inverter 120.

The reverse connection protection relay 142 is disposed at a position between the power relay 141 and the second inverter 120. The reverse connection protection relay 142 has a parasitic diode connected in reverse relative to a diode of the power relay 142, and prevents the electric current from flowing reversely, when the battery 5 is accidentally connected in reverse.

Although the switching elements 111-116, 121-126 and the relays 131, 132, 141, and 142 are a Metal Oxide Semiconductor Field Effect Transistor (MOSFET) respectively, those components may also be provided as an Insulated Gate Bipolar Transistor (IGBT) etc.

The first current detector 15 has a U1 current detection element 151, a V1 current detection element 152, and a W1 current detection element 153.

The U1 current detection element 151 is disposed on a low potential side of the switching element 114, and detects the electric current supplied to the U1 coil 811.

The V1 current detection element 152 is disposed on a low potential side of the switching element 115, and detects the electric current supplied to the V1 coil 812.

The W1 current detection element 153 is disposed on a low potential side of the switching element 116, and detects the electric current supplied to the W1 coil 813.

The detection value of the U1 current detection element 151 is designated as a U1 current detection value Iu1, the detection value of the V1 current detection element 152 is designated as a V1 current detection value Iv1, and the detection value of the W1 current detection element 153 is designated as a W1 current detection value Iw1.

The second current detector 16 has a U2 current detection element 161, a V2 current detection element 162, and a W2 current detection element 163.

The U2 current detection element 161 is disposed on a low potential side of the switching element 124, and detects the electric current supplied to the U2 coil 821.

The V2 current detection element 162 is disposed on a low potential side of the switching element 125, and detects the electric current supplied to the V2 coil 822.

The W2 current detection element 163 is disposed on a low potential side of the switching element 126, and detects the electric current supplied to the W2 coil 823.

The detection value of the U2 current detection element 161 is designated as a U2 current detection value Iu2, and the detection value of the V2 current detection element 162 is designated as a V2 current detection value Iv2, and the detection value of the W2 current detection element 163 is designated as a W2 current detection value Iw2.

The current detection elements 151-153, 161-163 of the present embodiment are a shunt resistor, respectively.

According to the present embodiment, the first inverter unit 11 is provided in a corresponding manner to the first winding group 81, and the second inverter unit 12 is provided in a corresponding manner to the second winding group 82.

Hereafter, a combination of the first winding group 81 and the first inverter unit 11 is described as a first system 201, and a combination of the second winding group 82 and the second inverter unit 12 is described as a second system 202. Further, a component in the first system 201 may be designated as a "first system component" and a component in the second system 202 may be designated as a "second system component."

The capacitor 21 and the choke coil 22 are disposed at a position between the first inverter 110 and the battery 5, and at a position between the second inverter 120 and the battery 5, and serve as a filter circuit.

The capacitor 21 and the choke coil 22 reduce a noise transmitted from the drive unit 1 to other devices among which the power supply from the battery 5 is shared while reducing a noise transmitted from the other devices which share the battery 5 with the drive unit 1. Further, the capacitor 21 assists a supply of the electric power to the first inverter 110 and to the second inverter 120 by storing an electric charge.

The rotation angle sensor 25 is provided as a magnetism detector, which detects a rotating magnetic field that rotates together with a rotation of the magnet on the shaft of the motor 80, for detecting a rotation angle of the motor 80.

The temperature sensor 26 detects the temperature of the board 60.

The temperature sensor 26 of the present embodiment is a thermo sensitive resister, or a thermistor.

The ASIC 27 has a pre-driver 275, a signal amplifier (not illustrated), a regulator, and the like.

The pre-driver 275 generates a drive signal based on voltage instruction values Vu1, Vv1, Vw1, Vu2, Vv2, and Vw2 mentioned later, and outputs a generated drive signal to the gate of the switching elements 111-116, 121-126.

The signal amplifier amplifies the detection values of the current detection elements 151-153, 161-163, the detection value of the rotation angle sensor 25, and the detection value of the temperature sensor 26, and outputs the amplified detection values to the control unit 30.

The regulator is a stabilization circuit that stabilizes the voltage supplied to the control unit 30 and the like.

In the present embodiment, a component connected with both of the first system 201 and the second system 202 is designated as a shared component, which is, for example, the capacitor 21, the choke coil 22, the ASIC 27 and the like.

The control unit 30 controls the entirety of the rotating electric machine control device 10, i.e., as a whole, and is implemented mainly as a microcontroller which performs various data processes.

Each process performed by the control unit 30 may be a software process by the execution of a program memorized in advance by a CPU, or may be a hardware process by a dedicated electronic circuit.

Figure 3:
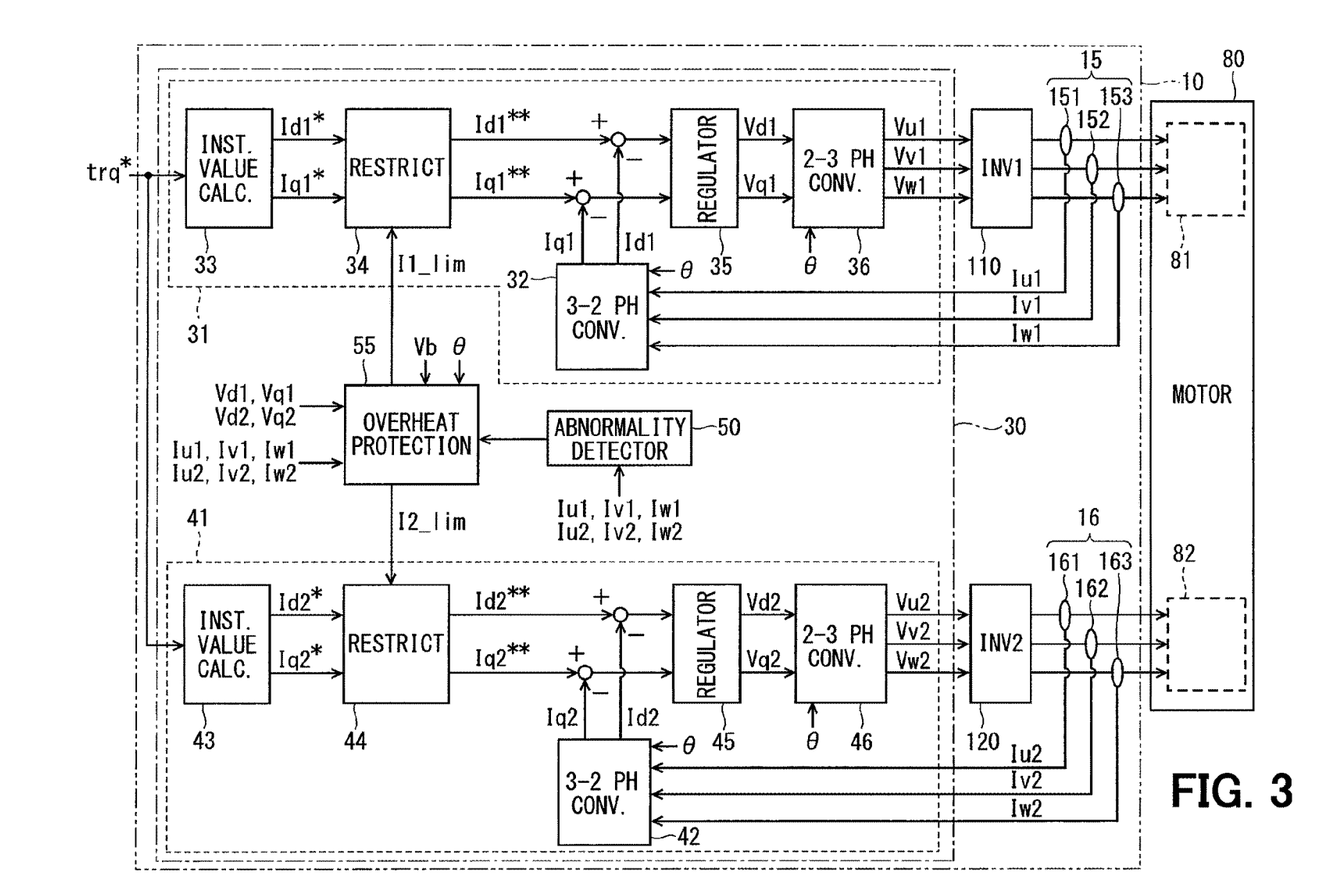
FIG. 3 is a block diagram of a control unit in the first embodiment of the present disclosure.

As shown in FIG. 3, the control unit 30 has a first system controller 31, a second system controller 41, an abnormality detector 50, and an overheat protection controller 55. Note that the rotation angle sensor 25, the temperature sensor 26, and the pre-driver 275 and the like are omitted from FIG. 3.

The first system controller 31 has a 3 to 2 phase converter 32, a current instruction value calculator 33, a current restrictor 34, and a regulator 35, and a 2 to 3 phase converter 36.

The second system controller 41 has a 3 to 2 phase converter 42, a current instruction value calculator 43, a current restrictor 44, a regulator 45 and a 2 to 3 phase converter 46.

As readily understood from the above, the first system controller 31 and the second system controller 41 have the same function blocks. Therefore, the following description focuses on the function blocks of the first system controller 31, and description concerning the second system controller 41 is omitted whenever appropriate. The calculation values in the second system controller 41 have a last-digit suffix of 2 that is switched from the last-digit suffix of 1 of the corresponding calculation values in the first system controller 31.

The 3 to 2 phase converter 32 performs a Direct Quadrature (dq) conversion of the U1 current detection value Iu1, the V1 current detection value Iv1, and the W1 current detection value Iw1 based on an electrical angle $\theta$ obtained from the rotation angle sensor 25, and calculates a d axis current detection value Id1 and a q axis current detection value Iq1.

The current instruction value calculator 33 calculates a d axis current instruction value Id1* and a q axis current instruction value Iq1* based on a torque instruction value trq* calculated according to a steering torque, a vehicle speed, etc.

The current restrictor 34 restricts the d axis current instruction value Id1* and the q axis current instruction value Iq1* based on a first current restriction value I1_lim outputted from the overheat protection controller 55, and calculates a d axis restricted instruction value Id1 and a q axis restricted instruction value Iq1.

When the size of the current vector of the d axis current instruction value Id1* and the q axis current instruction value Iq1* is equal to or less than the first current restriction value I1_lim, the d axis current instruction value Id1* and the q axis current instruction value Iq1* are set as the d axis restricted instruction value Id1 and the q axis restricted instruction value Iq1.

When the size of the current vector of the d axis current instruction value Id1* and the q axis current instruction value Iq1* is greater than the first current restriction value I1_lim, the current restrictor 34 restricts the value Id1* and the value Iq1* so that the size of the current vector becomes equal to the first current restriction value I1_lim.

The current restrictor 34 may restrict a d axis component and a q axis component so that the restricted values have the same phase as the d axis current instruction value Id1* and the q axis current instruction value Iq1*, or may set the d axis current instruction value Id1* as the d axis restricted instruction value Id1** while restricting the q axis component so that the size of the current vector becomes equal to the first current restriction value I1_lim.

The regulator 35 calculates a d axis voltage instruction value Vd1 by a PI calculation etc., so that a d axis current deviation ΔId1, which is a deviation of the d axis current detection value Id1 and the d axis restricted instruction value Id1**, converges to 0.

The regulator 35 calculates a q axis voltage instruction value Vq1 by the PI calculation etc., so that a q axis current deviation ΔIq1, which is a deviation of the q axis current detection value Iq1 and the q axis restricted instruction value Iq1**, converges to 0.

The 2 to 3 phase converter 36 performs a reverse dq conversion of the d axis voltage instruction value Vd1 and the q axis voltage instruction value Vq1 based on the electrical angle θ, and calculates a U1 the voltage instruction value Vu1, a V1 voltage instruction value Vv1, and a W1 voltage instruction value Vw1.

The abnormality detector 50 detects an abnormality of the drive unit 1 based on the current detection values Iu1, Iv1, Iw1, Iu2, Iv2, and Iw2 and other values. The abnormality detection result is outputted to the overheat protection controller 55.

According to the present embodiment, when the second system 202 has an abnormality, the drive of the motor 80 is continued by using the first system 201, and, when the first system 201 has an abnormality, the drive of the motor 80 is continued using the second system 202.

The overheat protection controller 55 restricts the electric current that flows in the first system 201 and the second system 202 so that an overheating of each component of the drive unit 1 will not be caused.

Figure 4:
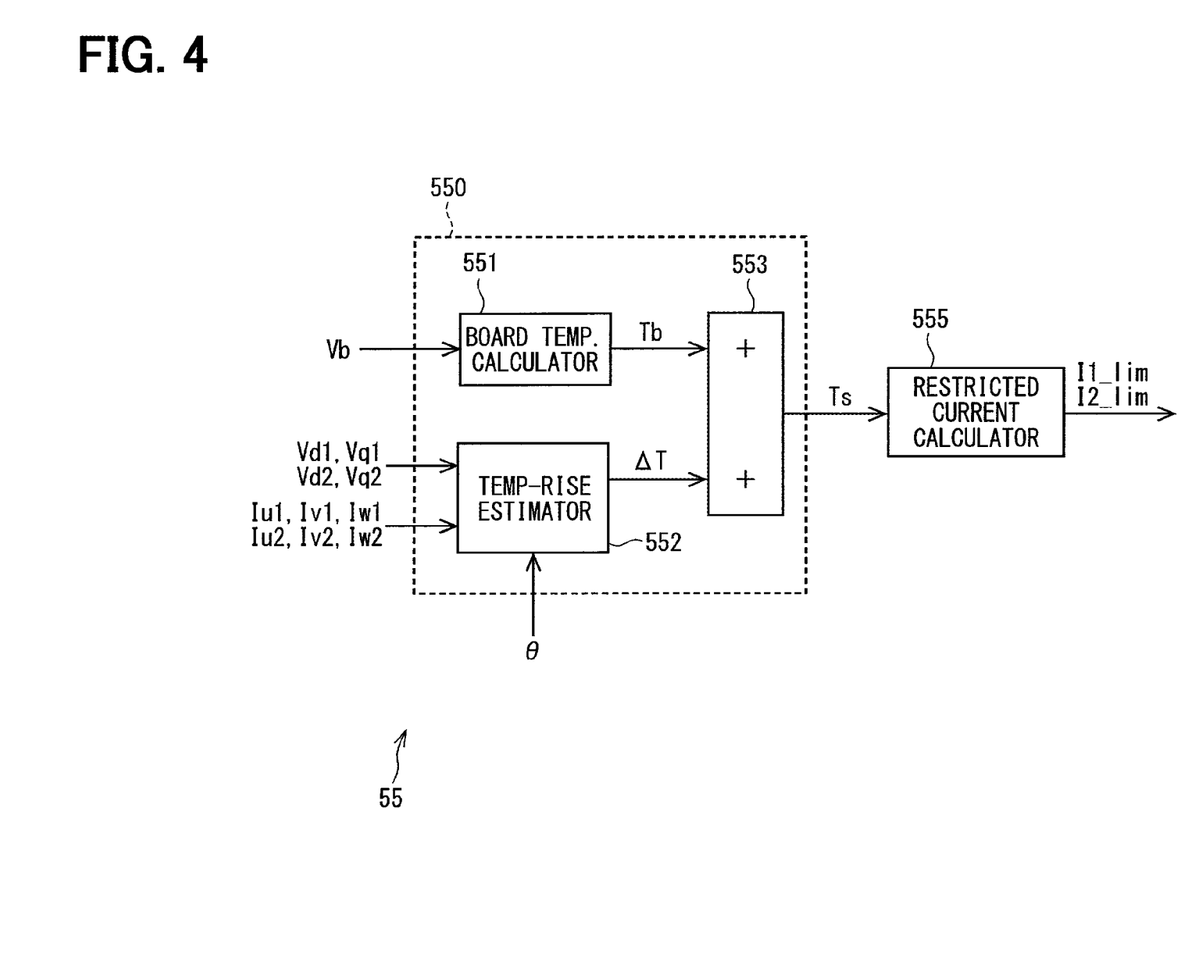
FIG. 4 is a block diagram of an overheat protection controller in the first embodiment of the present disclosure.

As shown in FIG. 4, the overheat protection controller 55 has a temperature estimator 550 and a restricted current calculator 555.

The temperature estimator 550 has a board temp calculator 551, a temp-rise estimator 552, and an adder 553.

The board temp calculator 551 calculates a board temperature Tb, which is a temperature of the board 60 based on a thermistor voltage Vb detected by the temperature sensor 26.

The temp-rise estimator 552 estimates the rise of the temperature of each component. An estimated temperature rise ΔT of each component is represented by the equation (1). A term K in the equation (1) is a temperature estimation coefficient, and is set up for each component. A term I is an electric current supplied to each component.

$$\Delta T = K \times I^2 \qquad \text{Equation (1)}$$

For example, when estimating the temperature of the switching element 111, the U1 current detection value Iu1 is used as an I in the equation (1).

A power supply electric current Ie which flows in the shared component is calculated by the equation (2). A term I1 in the equation (2) is an electric current before a phase branching in the first system, and a term I2 is an electric current before a phase branching in the second system 202.

The electric currents I1 and I2 before phase branching are estimated by equations (3-1) and (3-2).

$$Ie = I1 + I2 \qquad \text{Equation (2)}$$

$$I1 = Id1 \times Vd1 + Iq1 \times Vq1 \qquad \text{Equation (3-1)}$$

$$I2 = Id2 \times Vd2 + Iq2 \times Vq2 \qquad \text{Equation (3-2)}$$

In the adder 553, the estimated temperature rise ΔT is added to the board temperature Tb, and a component temperature Ts is calculated.

Although the winding groups 81 and 82 are not mounted on the board 60, the board temperature Tb is considered as an "ambient temperature", and the temperature of the winding groups 81 and 82 is calculated in the same manner as the temperature of each component mounted on the board 60.

Figure 5A:
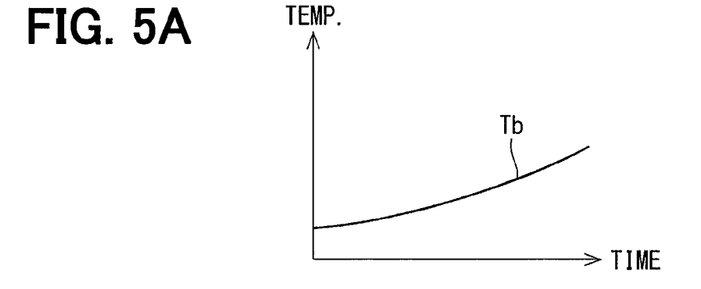
FIG. 5A is an illustration diagram of a board temperature, in the first embodiment of the present disclosure.
Figure 5B:
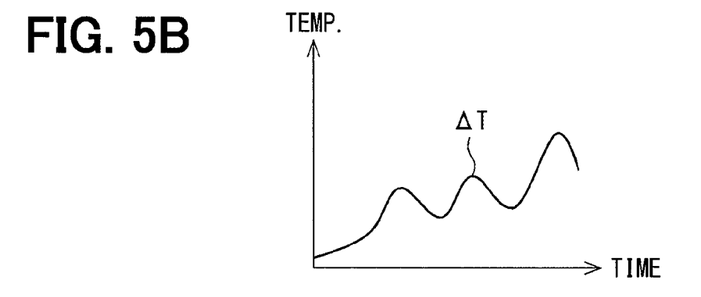
FIG. 5B is an illustration diagram of an estimated temperature rise in the first embodiment of the present disclosure.

As shown in FIG. 5A, the board temperature Tb rises as the time lapses. Further, as shown in FIG. 5B, the estimated temperature rise ΔT also rises as the time lapses, with a fluctuation according to the fluctuation of the electric current.

Figure 5C:
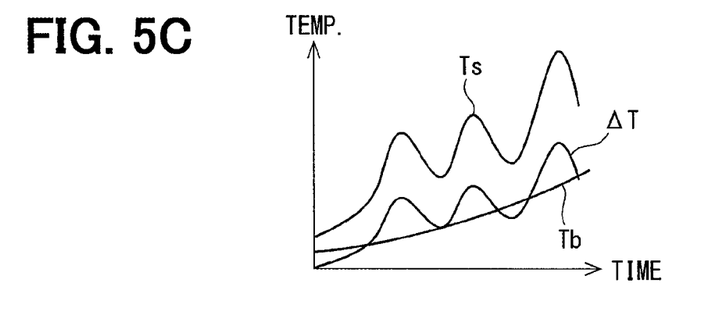
FIG. 5C is an illustration diagram of a component temperature along with the board temperature and the estimated temperature rise in the first embodiment of the present invention.

In the present embodiment, the component temperature Ts of each component is appropriately estimated by adding the estimated temperature rise ΔT to the board temperature Tb (refer to FIG. 5C).

FIGS. 5A/B/C are only for the illustration purposes, thereby not quantitatively accurate.

Returning the description to FIG. 4, the restricted current calculator 555 calculates the first current restriction value I1_lim, which restricts an upper limit of the electric current supplied to the first system 201, and the second current restriction value I2_lim which restricts an upper limit of the electric current supplied to the second system 202.

Figure 6:
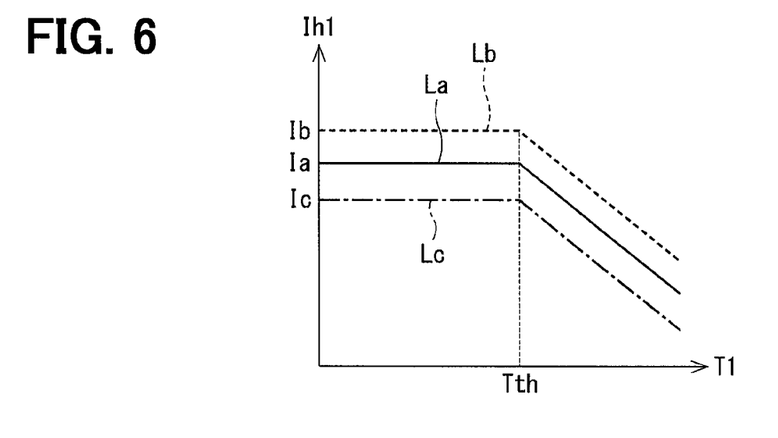
FIG. 6 is a diagram of showing an upper limit of the electric current in the first embodiment of the present disclosure.

A relationship between a first system temperature T1 and an upper limit current Ih1 in the first system 201 is described based on FIG. 6.

The upper limit current Ih1 of the first system 201 is calculated based on the first system temperature T1. The first system temperature T1 may be set to a component temperature, i.e., to the highest one of the temperatures of the switching elements 111-116, the relays 131 and 132, the current detection elements 151-153, and the coils 811-813 in the first system 201, or may be set to an average or other calculation value of the temperatures of all or a part of those components, for example. Alternatively, after calculating the upper limit current for each of the components in the first system 201, a lowest value among the calculated upper limit currents may be selected as the upper limit current Ih1.

As shown by a solid line La in FIG. 6, the upper limit current Ih1 when the first system temperature T1 is less than a threshold temperature Tth is a preset value Ia. Further, when the first system temperature T1 is greater than the threshold temperature Tth, the upper limit current Ih1 is decreased as the first system temperature T1 rises. The preset value Ia, an inclination of the graph, and the threshold temperature Tth may be arbitrarily set.

The upper limit current Ih2 of the second system 202 is calculated based on the second system temperature T2. The second system temperature T2 may be set to a component temperature, i.e., the highest one of the temperatures of the switching elements 121-126, the relays 141 and 142, the current detection elements 161-163, and the coils 821-823 in the second system 202, or may be set to an average or other calculation value of the temperatures of all or a part of those components, for example. Alternatively, after calculating the upper limit current for each of the components in the second system 202, a lowest value among the calculated upper limit currents may be selected as the upper limit current Ih2.

A power supply upper limit current Ihe, which is an upper limit of the power supply electric current Ie, is calculated based on a shared component temperature Te. The shared component temperature Te may be calculated in the same manner as the above, i.e., as the Ih1 and Ih2, by setting the highest temperature among the temperatures of the shared components to the shared component temperature Te, or by setting the average or other calculation value of the temperatures of the shared components to the shared component temperature Te, for example. Further, after calculating the upper limit current for each of the shared components, the lowest value may be set to the power supply upper limit current Ihe.

Since the details of the calculation of the upper limit current Ih2 of the second system 202 and the calculation of the power supply upper limit current Ihe are the same as that of the calculation of the upper limit current Ih1 of the first system 201, the illustration of the calculation of Ih2/Ihe is omitted.

The preset value Ia, an inclination of the graph, and the threshold temperature Tth may be the same values as the values concerning the calculation of the upper limit current Ih1, or may differ from the values thereof.

When all of the systems 201 and 202 are normal, i.e., at all-systems normal time, the power supply upper limit current the is distributed to the first system 201 and to the second system 202 according to distribution coefficients D1 and D2 which are arbitrarily set.

A first power supply upper limit current Ihe1 supplied to the first system 201 and a second power supply upper limit current Ihe2 supplied to the second system 202 are represented by equations (4-1) and (4-2).

According to the present embodiment, the distribution coefficient D1 and D2 are equal to each other, and the power supply electric current Ie shall be evenly distributed to the first system 201 and to the second system 202.

$$Ihe1 = Ihe \times D1/(D1+D2) \qquad \text{Equation (4-1)}$$

$$Ihe2 = Ihe \times D2/(D1+D2) \qquad \text{Equation (4-2)}$$

The first current restriction value I1_lim is taken as a smaller one of the upper limit current Ih1 and the first power supply upper limit current Ihe1. The second current restriction value I2_lim is taken as a smaller one of the upper limit current Ih2 and the second power supply upper limit current Ihe2.

The first current restriction value I1_lim is outputted to the current restrictor 34, and the second current restriction value I2_lim is outputted to the current restrictor 44.

Now, a situation in which one of the two systems 201, 202 has abnormality and the drive of the motor 80 is continued by the other of the two systems 201, 202 is described. The following description is based on an assumption that the second system 202 has the abnormality, and the drive of the motor 80 is continued by the first system 201.

In the following, temperature estimation is performed by using K1, K2, Ke. That is, a temperature estimation coefficient K1 for the temperature estimation of the first system component, a temperature estimation coefficient K2 for the temperature estimation of the second system component, and a temperature estimation coefficient Ke for the temperature estimation of the shared component. As described above, the temperature estimation coefficients K1, K2, and Ke are set for each of the components.

When continuing the drive of the motor 80 by using one of the two systems, the maximum value of the power supply electric current Ie is about one half of the normal time. Therefore, the amount of generated heat from the shared component in such a situation is about one fourth of the normal time. Thus, temperature estimation for estimating the temperature of the shared component by the normal time coefficient Ke may lead to a higher-than-actual temperature estimation. Therefore, in the present embodiment, at the time of one system drive of the motor 80, the coefficient Ke is adjusted to have a smaller value for yielding the lower estimation temperature.

Further, when increasing the assist amount of the first system 201 from the normal time, in order to compensate the insufficiency due to the stopping of the second system 202 by the first system 201, the amount of electric current which flows in the first system 201 is increased than the normal time.

Thus, temperature estimation for estimating the temperature of the first system component by the normal time coefficient K1 may lead to a higher-than-actual temperature estimation. Therefore, when the assist amount is increased from the normal time at the time of one system drive of the motor 80, the temperature coefficient K1 is adjusted to have a greater value than the normal time.

When the assist amount in the first system 201 is increased from the normal time, the upper limit current Ih1 is shown in FIG. 6 by a dashed line Lb. That is, the upper limit current Ih1 when the system temperature T1 is less than the threshold temperature Tth takes a value Ib that is greater than the preset value Ia of the normal time.

Further, at the time of one system drive of the motor 80, there may still, i.e., highly possibly, be a sufficient margin in the power supply upper limit current Ihe, the upper limit current Ih1 is set to the first current restriction value I1_lim.

On the other hand, when reducing the assist amount of the first system 201 to be less than the normal time in order to avoid a situation where the assist of the steering operation is completely stalled due to a double failure, i.e., a failure of both systems 201, 202, the amount of electric current that flows in the first system 201 becomes less than the normal time.

Thus, temperature estimation for estimating the temperature of the first system component by the normal time coefficient K1 may lead to an incorrect temperature estimation.

Therefore, at the time of one system drive of the motor 80, i.e., when controlling the assist amount to be decreased from the normal time, the temperature estimation coefficient K1 may be adjusted to a value smaller than the normal time.

When the assist amount in the first system 201 is decreased from the normal time, the upper limit current Ih1 is, as shown in FIG. 6, represented by a one-dot chain line Lc. That is, the upper limit current Ih1 when the system temperature T1 is less than the threshold temperature Tth takes a value Ic that is smaller than the preset value Ia of the normal time.

Note that, in FIG. 6, the threshold temperature Tth and the inclination are the same in both of the normal time and the one system drive time. However, the threshold temperature Tth and the inclination at the time of one system drive may be different from the normal time.

The above scheme is also applicable to a situation in which the first system 201 has the abnormality and the one system drive is performed by the second system 202.

Figure 7:
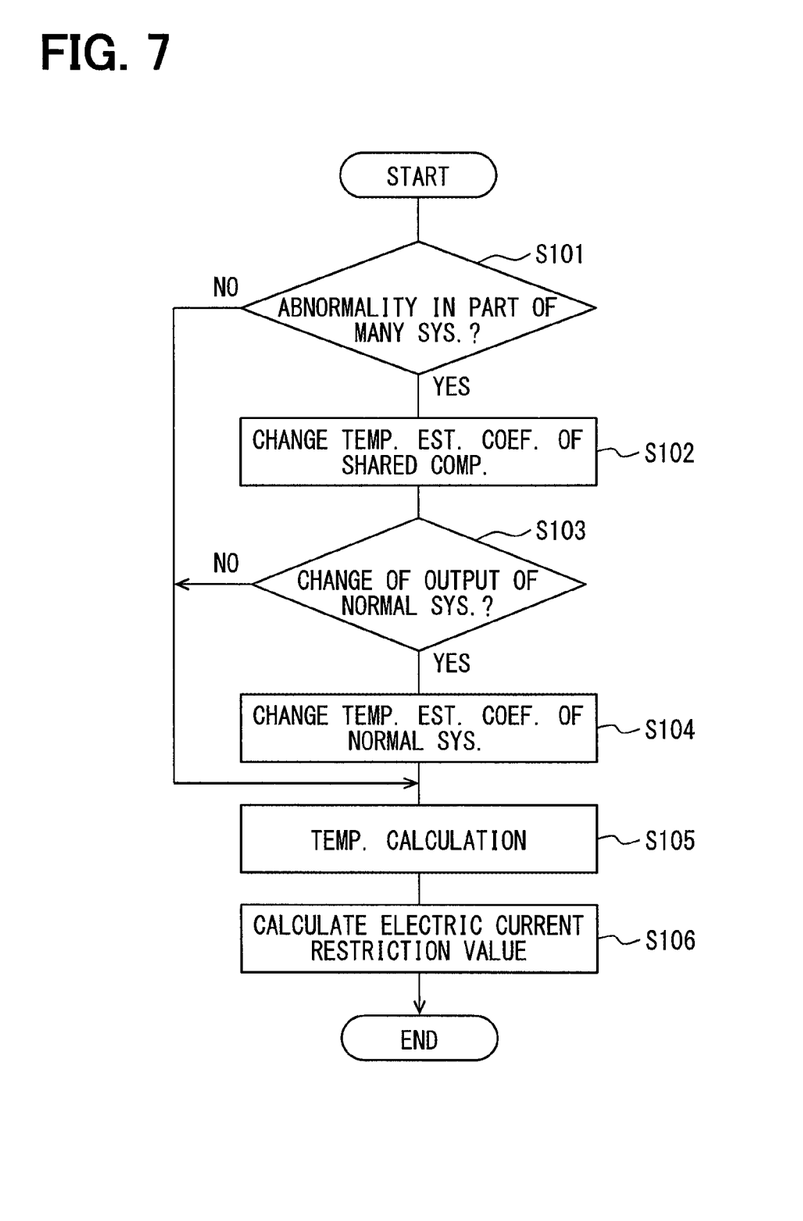
FIG. 7 is a flowchart of an overheat protection control in the first embodiment of the present disclosure.

An overheat protection control of the present embodiment is described based on the flowchart in FIG. 7. The overheat protection control is performed by the overheat protection controller 55 at the predetermined intervals during a starting (i.e., a start-up) of the electric power steering apparatus 8.

The calculation cycle may be the same as the calculation cycle of a normal feedback control in the first system controller 31 and the second system controller 41, or may be different from the normal feedback control.

In Step S101, which is a first step of a process, the temperature estimator 550 determines whether the abnormality is caused in one of two systems (i.e., IN PART OF MANY SYS. in FIG. 7).

When it is determined that all the systems 201 and 202 are normal (S101:NO), the process proceeds to S105. When it is determined that the abnormality is caused in some systems (S101:YES), the process proceeds to S102. Since the drive of the motor 80 cannot be continued when all the systems are abnormal, this process is not performed in such case.

In S102, the temp-rise estimator 552 changes the temperature estimation coefficient Ke concerning temperature estimation of the shared component to a different value from the normal time. In detail, the temperature estimation coefficient Ke is set to a smaller value than the normal time.

In S103, the temperature estimator 550 determines whether to change the output of the normal system from the output of the all-systems normal time.

When it is determined that the output of the normal system is not to be changed from the all-systems normal time (S103:NO), the process proceeds to S105. When it is determined that the output of the normal system is to be changed from the all-systems normal time (S103:YES), the process proceeds to S104.

In S104, the temp-rise estimator 552 changes the temperature estimation coefficient of the normal system. That is, if the normal system is the first system 201, the temperature estimation coefficient K1 is changed, and if the normal system is the second system 202, the temperature estimation coefficient K2 is changed.

When the output of the first system 201 is changed to a greater value than the all-systems normal time, the temperature estimation coefficient K1 is changed to a greater value than the all-systems normal time.

When the output of the first system 201 is changed to a smaller value than the all-systems normal time, the temperature estimation coefficient K1 is changed to a smaller value than the all-systems normal time.

When the output of the second system 202 is changed to a greater value than the all-systems normal time, the temperature estimation coefficient K2 is changed to a greater value than the all-systems normal time.

When the output of the second system 202 is changed to a smaller value than the all-systems normal time, the temperature estimation coefficient K2 is changed to a smaller value than the all-systems normal time.

In S105, the temperature estimator 550 calculates the component temperature Ts. When the temperature estimation coefficient is not changed in S102 or S104, the preset temperature estimation coefficient set up is used.

In S106, the restricted current calculator 555 calculates the first current restriction value I1_lim and the second current restriction value I2_lim based on the component temperature Ts.

According to the present embodiment, when the abnormality is caused in one of the two systems, the drive of the motor 80 is continued by the normal system in assumption. When continuing the drive of the motor 80 by using the normal system, the electric current which flows in each part may be different from the time when all the systems 201 and 202 are normal.

According to the present embodiment, when continuing the drive of the motor 80 by the normal system, since the temperature estimation coefficients K1, K2, and Ke are changed from the time when all the systems 201 and 202 are normal, the temperature of each component is appropriately estimated.

Further, by increasing the restricted current values I1_lim and I2_lim to be greater than the normal time when the drive of the motor 80 is continued by the normal system, the insufficiency of the assist amount is compensated.

Further, by decreasing the restricted current value I1_lim and I2_lim to be smaller than the normal time when the drive of the motor 80 is continued by the normal system, a risk of break down of the normal system is reduced.

As described in full details above, the rotating electric machine control device 10 of the present embodiment controls the drive of the motor 80, which has the plural winding groups 81 and 82, the plural inverter units 11 and 12 and the control unit 30.

The inverter units 11 and 12 are provided respectively for the winding groups 81 and 82. More practically, the first inverter unit 11 is provided in a corresponding manner to the first winding group 81, and, the second inverter unit 12 is provided in a corresponding manner to the second winding group 82.

The control unit 30 has the first system controller 31 and the second system controller 41, the overheat protection controller 55, and the abnormality detector 50.

The first system controller 31 and the second system controller 41 controls the electric current supplied to the winding groups 81 and 82.

The overheat protection controller 55 calculates the restricted current values I1_lim and I2_lim, which are the upper limit of the electric current supplied to the winding groups 81 and 82.

The abnormality detector 50 detects the abnormality of the winding groups 81 and 82 and the inverter units 11 and 12.

Note that the abnormality of the winding groups and the inverter units may indicate not only the abnormality of the winding groups 81 and 82 or the inverter units 11 and 12, but also the abnormality of the connected wiring and the like together with the signal abnormality, etc.

The overheat protection controller 55 includes the temperature estimator 550 and the restricted current calculator 555.

The temperature estimator 550 estimates the system temperatures T1, T2, and the shared component temperature Te.

The system temperatures T1 and T2 are, respectively, the temperature of the first system 201 and the temperature of the second system 202, which are provided as a combination of corresponding winding groups 81 and 82 and the inverter units 11 and 12. More practically, the first system temperature T1 is the temperature of the first system 201, and the second system temperature T2 is the temperature of the second system 202.

The shared component temperature Te is the temperature of the shared component connected with both of the plural systems 201 and 202.

The restricted current calculator 555 calculates the restricted current values I1_lim and I2_lim based on the system temperatures T1, T2, or the shared component temperature Te.

The following description is based on an assumption that the abnormality is caused in the second system 202 and the first system 201 the normal system. However, the control for the first system abnormal case, with the normal system of the second system 202, is basically the same.

In the present embodiment, when the abnormality of the second system 202, which is a part of the systems, is detected and the drive of the motor 80 is continued by using the first system 201, which is the normal system having no abnormality caused therein, at least one of the system temperatures T1, T2, the shared component temperature Te and/or the restricted current values I1_lim and I2_lim (i.e., one or more of these values, or any combination of one or more of these values) is changed from the all-systems normal time, i.e., from the values measured when all the systems 201 and 202 are normal.

The various calculations in the overheat protection controller 55 are usually designed to be based on an assumption that all the systems 201, 202 are normally operating, and the motor 80 is driven by using all the systems 201, 202. Therefore, the drive of the motor 80 by using only one system, i.e., by using only the normal system 201 and by not using the abnormal system 202, may be not optimally performable.

In view of such a situation, according to the present embodiment, when continuing the drive of the motor 80 by using the first system 201, at least one of the system temperatures T1, T2, the shared component temperature Te and/or the restricted current values I1_lim and I2_lim is changed.

In such manner, an overheat protection at a time of continuing the drive of the motor 80 by using the first system 201 is appropriately performed.

When the abnormality of the second system 202 is detected and the drive of the motor 80 is continued by using the first system 201, the temperature estimator 550 estimates the shared component temperature Te as a lower-than-normal value, i.e., as a value that is lower than the time when all of the systems 201, 202 are normally operating.

When continuing the drive of the motor 80 by using the normal system only, the amount of the electric current that flows in the shared component is highly likely smaller than the all-systems normal time. Therefore, the shared component temperature Te is estimated to be lower than the all-systems normal time. In such manner, the shared component temperature Te when continuing the drive of the motor 80 by using the normal one of the winding groups 81 and 82 is estimated appropriately.

When changing the supply amount of the electric current to the first system 201 from the all-systems normal time, the temperature estimator 550 changes, from the all-systems normal time, the first system temperature T1 which is the system temperature concerning the first system 201.

For example, when increasing the supply amount of the electric current to the first system 201 than the all-systems normal time, the temperature estimator 550 estimates the first system temperature T1 to be higher than the all-systems normal time.

Further, for example, when decreasing the supply amount of the electric current to the first system 201 than the all-systems normal time, the temperature estimator 550 estimates the first system temperature T1 to be lower than the all-systems normal time.

Thereby, according to the supply amount of the electric current to the first system 201 which is the normal system, the first system temperature T1 is estimated appropriately.

The restricted current calculator 555 increases the restricted current value I1_lim of the electric current supplied to the first system 201 than the all-systems normal time.

For example, "the restricted current calculator increases the restricted current value supplied to the normal system than the all-systems normal time" (CL 7) means that the restricted current value I1_lim is set to infinite and the electric current restriction operation is not performed. In such manner, the insufficiency of the torque due to the stopping of the abnormal second system 202 may be compensated.

The restricted current calculator 555 may decrease the restricted current value I1_lim of the electric current supplied to the first system 201 than the all-systems normal time. In such manner, a risk of causing the abnormality in the normal system and disabling the continuation of the drive of the motor 80 is reduced.

The motor 80 of the present disclosure is used in the electric power steering apparatus 8, and outputs, to the steering shaft 92, the assist torque for assisting the steering operation of the steering wheel 91 by the driver.

Thereby, even when an abnormality is caused in a part of the systems, the assist of the steering operation is appropriately continuable by using the normal system.

According to the present embodiment, the first system controller 31 and the second system controller 41 respectively correspond to an "electric current controller."

Second Embodiment

Figure 8A:
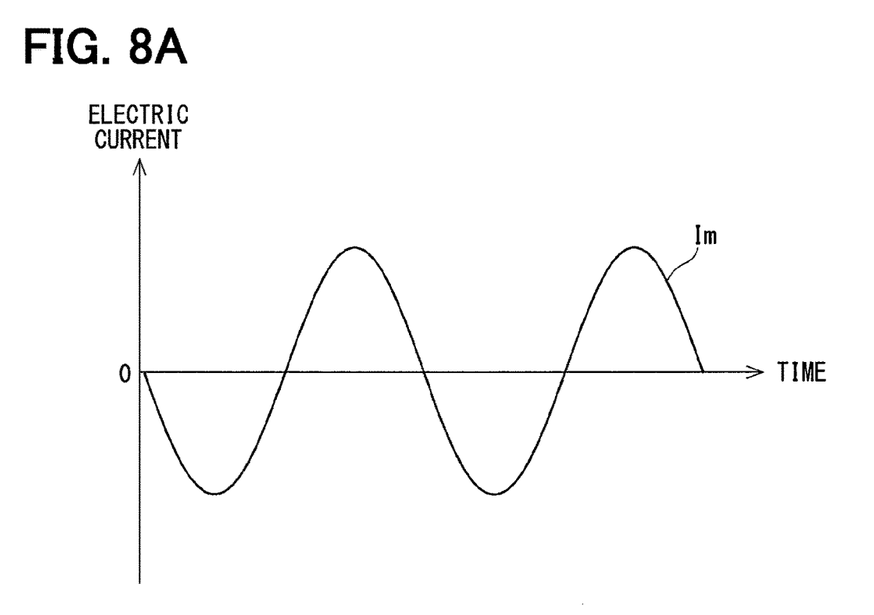
FIG. 8A is a diagram of the electric current when a motor is in a rotating state in a second embodiment of the present disclosure.
Figure 8B:
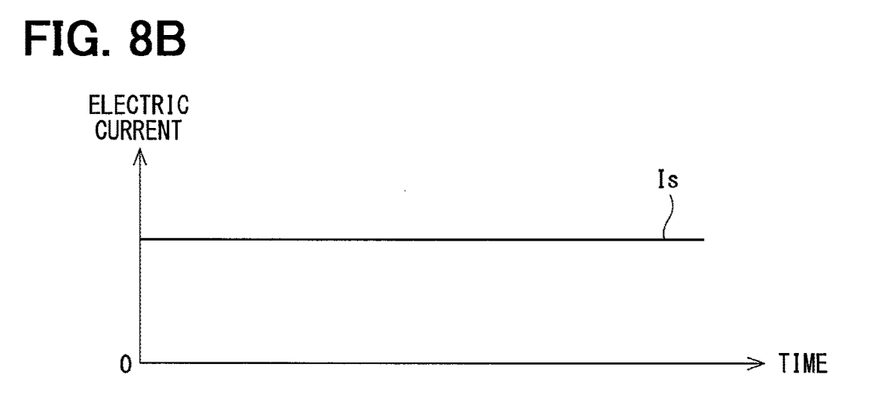
FIG. 8B is a diagram of the electric current when the motor is in a stop state in the second embodiment of the present disclosure.
Figure 9:
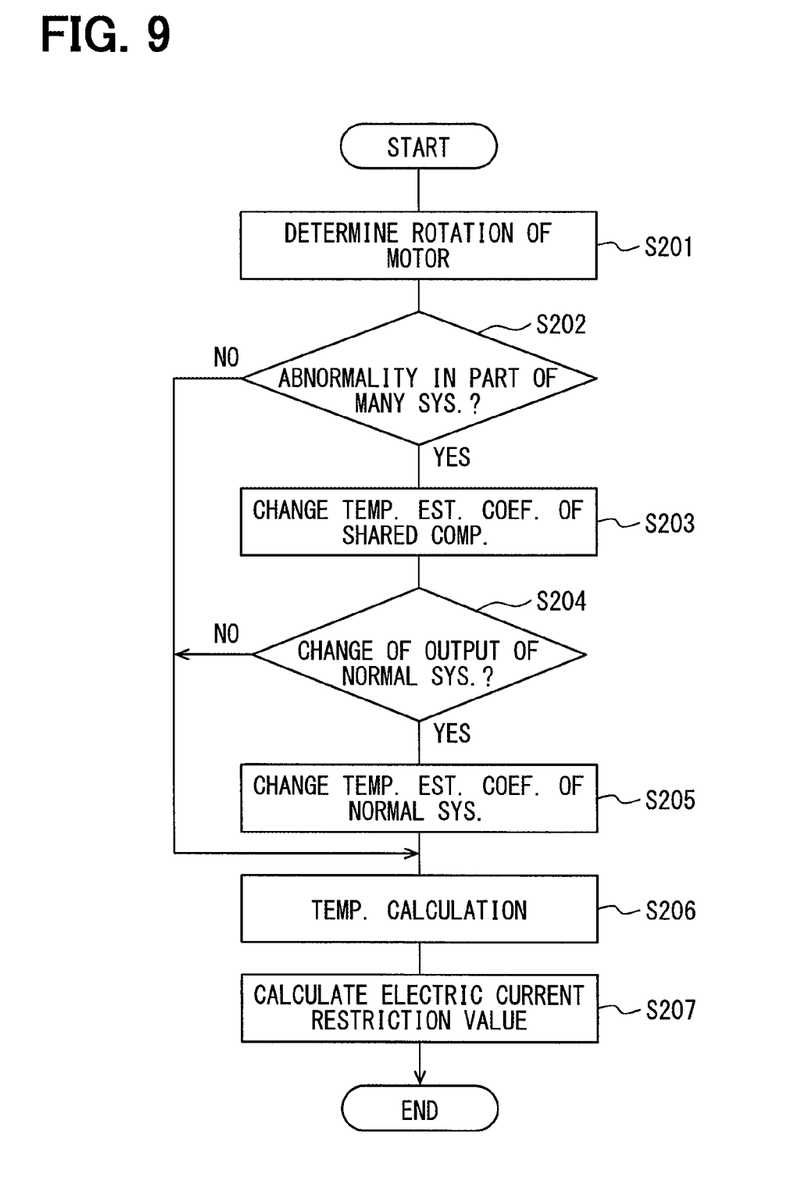
FIG. 9 is a flowchart of the overheat protection control in the second embodiment of the present disclosure.

The second embodiment of the present disclosure is described based on FIGS. 8 and 9.

According to the present embodiment, the calculation in the temp-rise estimator 552 is different from the above-mentioned embodiment.

FIG. 8A shows the electric current that flows in one of the switching elements during the rotation of the motor 80, and FIG. 8B shows the electric current that flows in one the switching elements during a stop time of the motor 80. In the following, the switching element 111 is taken as an example.

As shown in FIG. 8A, while the motor 80 is rotating, an AC current Im in a sine wave shape flows in the switching element 111. On the other hand, as shown in FIG. 8B, when the motor 80 stops, an electric current Is that is substantially a direct current flows in the switching element 111. Therefore, the amount of heat generation in the switching element 111 is greater when the motor 80 is in a stop state, than when the motor 80 is in a rotating state.

Therefore, according to the present embodiment, the temperature estimation coefficient K is changed depending on whether the motor 80 is rotating or is in the stop state.

More practically, for each component, when a coefficient Km is used for temperature estimation of rotating motor, and a coefficient Ks is used for temperature estimation of the motor in the stop state, a value of Ks is set as greater than a value of Km (i.e., Ks>Km).

In such case, the change of the temperature estimation coefficients between the motor rotation time and the motor stop time may be only the coefficients K1, K2 without changing the coefficient Ke for the shared component, for example. In other words, the coefficient does not have to be changed for all components in the control device according to an operation state of the motor 80.

The overheat protection control of the present embodiment is described based on the flowchart shown in FIG. 9.

In S201, the temp-rise estimator 552 performs a motor rotation determination of the motor 80. According to the present embodiment, when an electrical angle speed ω calculated from the electrical angle θ is greater than a determination threshold value, it is determined that the motor 80 is rotating. Further, instead of using the electrical angle speed, a steering angle speed may be used for the motor rotation determination.

The process of S202-S207 is substantially the same as that of the process of S101-S106 in FIG. 7, thereby not repeated in the present embodiment. However, the temperature estimation coefficient for the temperature calculation is adjusted to have a greater value for the motor stop time than for the motor rotation time. The temperature estimation coefficient may be stored for both of the motor rotation time, and the motor stop time, or may be stored only for one of the above two situations, with the other one calculated therefrom, i.e., by multiplying a conversion coefficient on one of the two for calculating the other.

The temperature estimator 550 estimates a higher value for at least one of the system temperatures T1, T2 and/or the shared component temperature Te when the motor 80 is in the stop state, than when the motor 80 is in the rotating state.

Thereby, according to the driving state of the motor 80, the system temperature T1, T2, and the shared component temperature Te are estimated appropriately.

Third Embodiment

Figure 10:
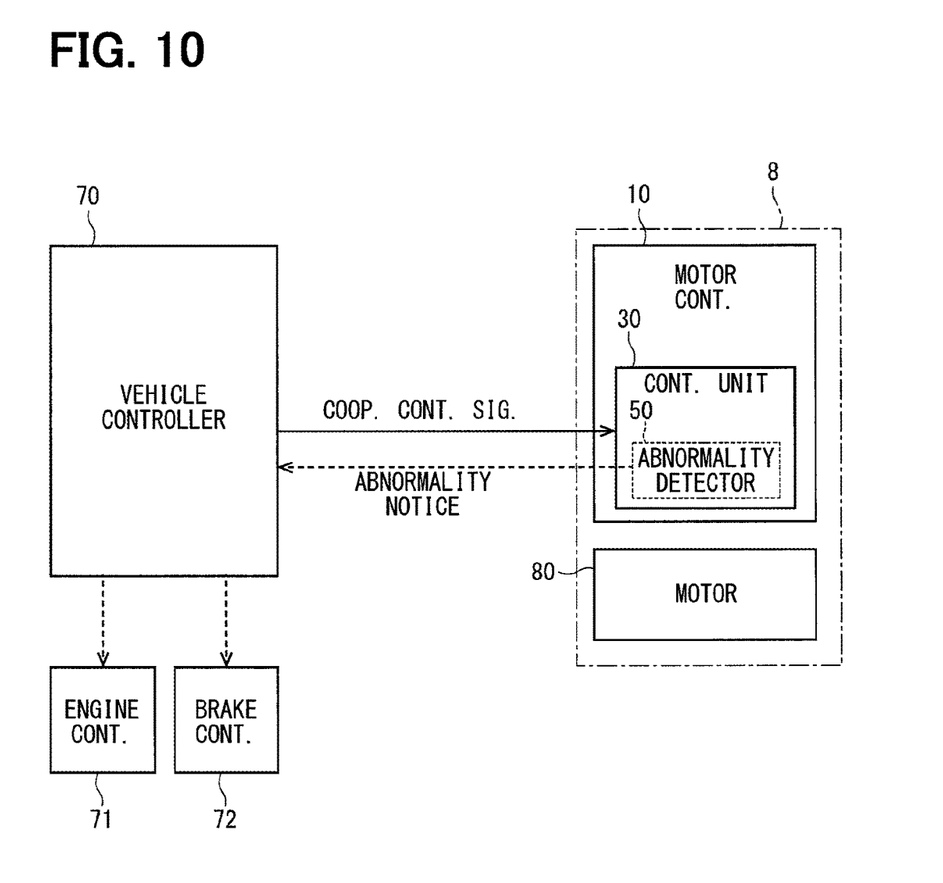
FIG. 10 is a block diagram of the rotating electric machine control device in a third embodiment of the present disclosure.

The third embodiment of the present disclosure is shown in FIG. 10.

The rotating electric machine control device 10 of the present embodiment is applied to the electric power steering apparatus 8, just like the above mentioned embodiments, and controls the drive of the motor 80 that outputs the assist torque.

As shown in FIG. 10, the rotating electric machine control device 10 of the present embodiment performs, under an instruction from a vehicle controller 70 in a higher control level, a cooperative control for the motor 80 and for the other devices, e.g., for the arrangement of cooperation between the engine device, the brake device, and the motor 80. The cooperative control means, more practically, that the vehicle is controlled for a desired operation under a cooperation of many devices such as the electric power steering apparatus 8 and other devices disposed in the vehicle. Specifically, a gear ratio variable control, an automatic driving, an automatic parking, a lane keep assist, an urgent maneuver (i.e., a collision avoidance), etc. are included in the cooperative control.

The vehicle controller 70 transmits a cooperative control signal to an engine control device 71, a brake control device 72, the rotating electric machine control device 10 and the like, and controls operation of "traveling", "making turns", and "stopping" in an integrated manner.

In the cooperative control, when a cooperating device has abnormality, the cooperating device may not be capable of performing the cooperative control. Therefore, according to the present embodiment, when the abnormality is detected by the abnormality detector 50, the information about the present abnormality ("ABNORMALITY NOTICE" in FIG. 7) is transmitted to the vehicle controller 70. When the abnormality is detected, the control unit 30 refuses a reception of the cooperative control signal, so that the electric power steering apparatus 8 is not used for the cooperative control.

The electric power steering apparatus 8 in the present embodiment is used for the cooperative control that arranges the cooperation among the devices in the vehicle based on the cooperative control signal from the vehicle controller 70. The control unit 30 refuses a reception of the cooperative control signal, when the abnormality is detected by the abnormality detector 50.

Thereby, an unintended/unexpected behavior of the vehicle due to the cooperative control of abnormal devices, e.g., the electric steering apparatus 8 having abnormality, is prevented.

Other Embodiments (a) Inverter Unit

In the above-mentioned embodiments, the inverter, the relay unit, and the current detector are contained in the inverter unit.

In different embodiments, the inverter unit may include the inverter and the relay unit only, or may include the inverter and the current detector or may include the inverter only. Further, the inverter unit may include other devices other than the above. In other words, the "inverter unit" in the specification of the present disclosure means a unit of devices for each of the winding groups in the rotating electric machine.

In the above-mentioned embodiment, the current detection element is a shunt resistor.

In different embodiments, the current detection element may be an element other than the shunt resistor, i.e., may be a Hall IC or the like. Further, the current detection element provided on a low potential side of the switching element in the above-mentioned embodiment may be provided at other positions other than the low potential side of the switching element in different embodiments.

Further, in different embodiments, the rotational angle sensor may be any sensor/device such as a resolver or the like other than the magnetism detector. Similarly, in different embodiments, the temperature sensor may be any sensor/device other than the thermistor.

(b) Shared Component

In the above-mentioned embodiments, the shared component includes the capacitor, the choke coil, and the ASIC.

In different embodiments, the shared component may exclude at least one of the capacitor, the choke coil, and/or a part of the ASIC, and may also include other components other than the above.

(c) Board

In the above-mentioned embodiments, the inverter unit and the shared component are mounted on the one board/substrate.

In different embodiments, the inverter unit and the shared component may be mounted on plural boards/substrates.

(d) System Temperature, Shared Component Temperature

In different embodiments, the first system temperature may be calculated for at least a part of the components serving as the first system, without calculating the temperature for all components in the system. The same applies to the second system temperature and to the shared component temperature.

In the above-mentioned embodiments, the temperature of each component is estimated by adding the estimated temperature rise to the board temperature.

In different embodiments, the temperature of each component may be estimated by adding the estimated temperature rise to an "ambient" temperature, i.e., to the temperature of other nearby matter other than the board. Further, the temperature of each component may also be estimated in any method other than the above.

In the second embodiment, the temperature estimation coefficient is changed depending on whether the rotating electric machine is in the stop state or in the rotating state.

In different embodiments, the temperature estimation coefficient may be changed according to the torque instruction value or to the current instruction value. For example, in view of a situation that the amount of heat generation increases when the rotating electric machine is in the stop state and the instruction value is greater than a determination threshold, at least one of the system temperatures and/or the shared component temperature in such situation may be estimated to be a higher value than other situations, e.g., than a time when the rotating electric machine is in the rotating state or than a time when the instruction value is smaller than a determination threshold.

In the above-mentioned embodiments, the temperature estimator changes the temperature estimation coefficient for changing the temperature estimation.

In different embodiments, the temperature estimator may change other factors other than the temperature estimation coefficient for changing the temperature estimation.

(e) Overheat Protection Controller

In the above-mentioned embodiments, when the abnormality is caused in a part of the plural systems and the drive of the rotating electric machine is continued by using the normal system, the system temperature, the shared component temperature, and the restricted current value are changed from the all-systems normal time.

In different embodiments, when the abnormality is caused in a part of the plural systems and the drive of the rotating electric machine is continued by using the normal system, at least one of the system temperature, the shared component temperature, and/or the restricted current value needs to be changed from the all-systems normal time, i.e., all of the above need not be changed from the all-systems normal time.

(f) Rotating Electric Machine

In the above-mentioned embodiments, the rotating electric machine is a three-phase brushless motor.

In different embodiments, the rotating electric machine may be an alternate current (AC) motor having four phases or more, or a brush-equipped direct current (DC) motor or any kind of motor. Further, the rotating electric machine functioning as an electric motor in the above-mentioned embodiments may be, in different embodiments, a motor-generator functioning as both of a motor and a generator.

(g) Drive Unit

In the above-mentioned embodiments, the drive unit is provided with the two inverter units that correspond to two sets of the winding groups, and the rotating electric machine is driven by two systems of electric circuits. In different embodiments, the number of systems may be not only two but may also be three or more.

In the above-mentioned embodiments, the drive unit is applied to the electric power steering apparatus. In different embodiments, the drive unit may be applied to the devices other than the electric power steering apparatus.

In the third embodiment, the electric power steering apparatus is used for the cooperative control. In different embodiments, the electric power steering apparatus needs not be used for the cooperative control.

Although the present disclosure has been described in connection with preferred embodiment thereof with reference to the accompanying drawings, it is to be noted that various changes and modifications become apparent to those skilled in the art, and such changes, modifications, and summarized schemes are to be understood as that is within the scope of the present disclosure as defined by appended claims.

What is claimed is:

1. A rotating electric machine control device for driving a rotating electric machine that has plural winding groups for plural systems, the rotating electric machine control device comprising:
   a plurality of inverter units, each unit respectively provided for each winding group; and
   a control unit, including:
      an electric current controller configured to control an electric current supplied to the plural winding groups;
      an overheat protection controller configured to calculate an upper limit of the electric current supplied to the plural winding groups as a restricted current value; and
      an abnormality detector configured to detect an abnormality, wherein
   the overheat protection controller includes:
      a temperature estimator (i) configured to estimate a system temperature of a system that is provided as a set of a corresponding winding group and an inverter unit for each of the plural systems and/or (ii) configured to estimate a common temperature that is common among the plural systems; and
      a restricted current calculator configured to calculate the restricted current value based on the system temperature and/or the common temperature, and wherein
   the system temperatures and/or the common temperature are/is changed from a value during an all-systems normal time when all of the plural systems operate without having abnormality, when at least one of the plural systems is detected as abnormal by the abnormality detector, and a drive of the electric rotating machine is continued by using at least one of remaining systems that is functioning normally, and wherein
   the temperature estimator estimates the common temperature as a lower value than the all-systems normal time, when at least one of the plural systems is abnormal, and the drive of the electric rotating machine is continued by using at least one of remaining systems that is functioning normally.

2. The rotating electric machine control device of claim 1, wherein
   the temperature estimator changes an estimation of the system temperature of the normal system from the all-systems normal time, when a supply amount of the electric current to the normal system is changed from the all-systems normal time.

3. The rotating electric machine control device of claim 2, wherein
   the temperature estimator changes an estimation of the system temperature of the normal system to be higher than the all-systems normal time, when the supply amount of the electric current to the normal system is increased from the all-systems normal time.

4. The rotating electric machine control device of claim 2, wherein
   the temperature estimator changes an estimation of the system temperature of the normal system to be lower than the all-systems normal time when the supply amount of the electric current to the normal system is decreased from the all-systems normal time.

5. The rotating electric machine control device of claim 1, wherein
the temperature estimator changes an estimation of at least one of the system temperature and the common temperature to be higher than a rotating state in which the rotating electric machine is rotating when the rotating electric machine is in a stop state.

6. The rotating electric machine control device of claim 1, wherein the temperature estimator is configured to
estimate the common temperature as a shared component temperature shared among the plural systems, or
detect the common temperature as a board temperature of a board connected to the shared components shared among the plural systems.

7. An electric power steering apparatus, including a rotating electric machine and a rotating electric machine control device, the rotating electric machine configured to output an assist torque to a drive object for assisting a steering operation of a steering member by a driver, and the rotating electric machine control device configured to control a drive of the rotating electric machine, the electric power steering apparatus comprising:
a plurality of inverter units, each unit respectively provided for each winding group; and
a control unit, including:
an electric current controller configured to control an electric current supplied to the plural winding groups;
an overheat protection controller configured to calculate an upper limit of the electric current supplied to the plural winding groups as a restricted current value; and
an abnormality detector configured to detect an abnormality, wherein
the overheat protection controller includes:
a temperature estimator (i) configured to estimate a system temperature of a system that is provided as a set of a corresponding winding group and an inverter unit for each of the plural systems and/or (ii) configured to estimate a common temperature that is common among the plural systems; and
a restricted current calculator configured to calculate the restricted current value based on the system temperature and/or the common temperature, and wherein
the system temperatures and/or the common temperature are/is changed from a value during an all-systems normal time when all of the plural systems operate without having abnormality, when at least one of the plural systems is detected as abnormal by the abnormality detector, and a drive of the electric rotating machine is continued by using at least one of remaining systems that is functioning normally, and wherein
the electric power steering apparatus is included in a cooperative control that is performed under a cooperative control signal from a vehicle controller for a cooperation with other in-vehicle devices, and wherein the control unit refuses a reception of the cooperative control signal, when the abnormality detector detects abnormality.

8. A rotating electric machine control device for driving a rotating electric machine having a plurality of winding groups for a plurality of systems, the rotating electric machine control device comprising:
a plurality of inverter units, each unit respectively provided for each winding group; and
a control unit, including:
an electric current controller configured to control an electric current supplied to the plurality of winding groups;
an overheat protection controller configured to calculate an upper limit of the electric current supplied to the plurality of winding groups as a restricted current value; and
an abnormality detector configured to detect an abnormality, wherein the overheat protection controller includes:
a temperature estimator configured to estimate a system temperature of a system that is provided as a set of a corresponding winding group and an inverter unit for each of the plurality of systems and/or configured to estimate a common temperature that is common among the plurality of systems; and
a restricted current calculator configured to calculate the restricted current value based on the system temperature and/or the common temperature, and wherein
the system temperatures and/or the common temperature are/is changed from a value during an all-systems normal time when all of the plurality of systems operate without having abnormality, when at least one of the plurality of systems is detected as abnormal by the abnormality detector, and a drive of the electric rotating machine is continued by using at least one of remaining systems that is functioning normally, and wherein
the temperature estimator is further configured to
estimate the common temperature as a shared component temperature shared among the plurality of systems, or
detect the common temperature as a board temperature of a board connected to the shared components shared among the plurality of systems.

* * * * *